United States Patent
Yao

(10) Patent No.: US 11,256,409 B2
(45) Date of Patent: Feb. 22, 2022

(54) SYSTEMS, METHODS, DEVICES, AND COMPUTER READABLE MEDIA FOR FACILITATING DISTRIBUTED PROCESSING OF DOCUMENTS

(71) Applicant: CSOFT International, Beijing (CN)

(72) Inventor: Carl Yao, Beijing (CN)

(73) Assignee: CSOFT International, Beijing (CN)

( * ) Notice: Subject to any disclaimer, the term of this patent is extended or adjusted under 35 U.S.C. 154(b) by 0 days.

(21) Appl. No.: 16/996,152

(22) Filed: Aug. 18, 2020

(65) Prior Publication Data

US 2021/0034211 A1 Feb. 4, 2021

Related U.S. Application Data

(63) Continuation of application No. 15/146,497, filed on May 4, 2016, now Pat. No. 10,747,419.

(60) Provisional application No. 62/232,469, filed on Sep. 25, 2015, provisional application No. 62/266,085, filed on Dec. 11, 2015.

(51) Int. Cl.
*G06F 3/0488* (2013.01)
*G06F 40/47* (2020.01)
*H04L 41/12* (2022.01)
*H04L 67/1097* (2022.01)
*G06F 40/205* (2020.01)

(52) U.S. Cl.
CPC ............ *G06F 3/0488* (2013.01); *G06F 40/47* (2020.01); *H04L 41/12* (2013.01); *H04L 67/1097* (2013.01); *G06F 40/205* (2020.01)

(58) Field of Classification Search
CPC .................................................... G06F 3/0488
See application file for complete search history.

(56) References Cited

U.S. PATENT DOCUMENTS

| | | | |
|---|---|---|---|
| 6,473,729 B1 | 10/2002 | Gastaldo et al. | |
| 6,535,842 B1 * | 3/2003 | Roche et al. | ........... G06F 17/28 |
| 8,001,464 B1 | 8/2011 | Goel et al. | |
| 9,881,003 B2 | 1/2018 | Hartrell et al. | |
| 2003/0005121 A1 | 1/2003 | Washio et al. | |
| 2007/0150260 A1 | 6/2007 | Lee et al. | |
| 2008/0270110 A1 | 10/2008 | Yurick et al. | |
| 2008/0281578 A1 | 11/2008 | Kumaran et al. | |
| 2011/0202334 A1 | 8/2011 | Abir | |
| 2013/0173817 A1 | 7/2013 | Field et al. | |

(Continued)

*Primary Examiner* — James J Debrow
(74) *Attorney, Agent, or Firm* — Finnegan, Henderson, Farabow, Garrett & Dunner, LLP

(57) ABSTRACT

A system for managing distributed text content processing is provided. The system comprises a processor configured to execute a set of instructions to: acquire data of a first document for processing; parse the data of the first document; generate at least a first original text content fragment and a second original text content fragment based on a result of the parsing; transmit the first original text content fragment to a first processing device; determine a status of processing of the first original text content fragment; determine, based on the status, to transmit the second original text content fragment to either the first processing device or to a second processing device for processing; receive a second processed text content fragment from one of the first or second processing devices; and generate a processed document including the received second processed text content fragment.

5 Claims, 9 Drawing Sheets

(56) References Cited

U.S. PATENT DOCUMENTS

2013/0205202 A1    8/2013   Xiao et al.
2014/0164352 A1    6/2014   Denninghoff
2016/0267074 A1*   9/2016   Nozue .................... G06F 17/28

* cited by examiner

SYSTEMS, METHODS, DEVICES, AND COMPUTER READABLE MEDIA FOR FACILITATING DISTRIBUTED PROCESSING OF DOCUMENTS

RELATED APPLICATION

This application is a continuation of U.S. patent application Ser. No. 15/146,497, filed on May 4, 2016, which is based upon and claims priority to U.S. Provisional Application 62/232,469, filed on Sep. 25, 2015, and U.S. Provisional Application 62/266,085, filed on Dec. 11, 2015, the contents of each of which are incorporated herein by reference in their entirety.

TECHNICAL FIELD

This disclosure generally relates to distributed data processing, including the distributed processing of document text. More particularly, this disclosure relates to systems, methods, and devices for facilitating the distributed translation of document text from one language to another by human translators.

BACKGROUND

Distributed processing refers to a process in which the processing task is distributed among multiple devices that each participate in the performance of the task. One example is distributed computing, in which a computation task is divided into a plurality of sub-tasks, and the sub-tasks are performed by a plurality of devices (e.g., by a computer processor included in each of the plurality of devices). Such an arrangement not only can balance the workload among devices but also can mitigate the risk that a particular device becomes a bottleneck. For example, a system may determine the current workload on each of a plurality of devices, and then assign one or more sub-tasks to a device based on that device's workload, as compared with the workload of other available devices.

While computer processors are very good at performing some tasks (in particular mathematical calculations and rote tasks involving large amounts of data), they are still unable to satisfactorily perform certain tasks. For example, machine translations of documents, e.g., as provided by Google Translate and other software, often fail to correctly convey the idiomatic meaning of the original text. Instead, cultural idioms are often translated directly word-for-word, with the result that the original meaning is changed or the translated text is meaningless. In addition, machine translations often fail to follow grammatical rules, and are often incorrectly punctuated and/or formatted. Machine translations of text documents are thus generally not acceptable for use in many applications, e.g., in translations of legal documents, commercial documents, government documents, and Internet pages.

Consequently, important documents are typically given to professional human translators for translation. However, human translators typically work alone to translate a complete document. As a result, human translators are relatively slow and expensive, so that the translations—although of high quality—are untimely and needlessly expensive. In many cases, the expense of professional human translation is cost-prohibitive, so that interested parties are forced to contend with non-idiomatic machine translations.

Further, human translators generally use conventional word processing software, which typically provides an interface that is intended for a conventional desktop (or laptop) display. Such an interface typically displays full pages of both the original and translated documents, and is unsuited for the smaller displays available on mobile devices, such as smartphones and tablets. As a result, translators are confined to working where they may conveniently access a laptop or desktop, and thus unable to perform their work, e.g., while travelling or commuting. In addition, although smartphone ownership is becoming ubiquitous even among lower income people, many bilingual people still lack routine access to a laptop or desktop computer. As a result, they are prevented from obtaining employment as translators.

Systems, methods, devices, and computer readable media consistent with the present disclosure facilitate the distributed processing of documents and, in particular, the collaborative translation of documents by human translators. Systems, methods, devices, and computer readable media consistent with the present disclosure also provide an intuitive interface suitable for display on mobile devices.

SUMMARY

Disclosed embodiments include systems, methods, devices, and computer-readable media for distributed text processing.

In one aspect, a system for managing distributed text content processing is provided. The system comprises a memory storing a set of instructions, and a hardware processor configured to execute the set of instructions to: acquire data of a first document for processing; parse the data of the first document; generate at least a first original text content fragment and a second original text content fragment based on a result of the parsing; transmit the first original text content fragment to a first processing device; determine a status of processing of the first original text content fragment; determine, based on the status, to transmit the second original text content fragment to either the first processing device or to a second processing device for processing; receive a second processed text content fragment from one of the first or second processing devices; and generate a processed document including the received second processed text content fragment.

In another aspect, a method for managing distributed text content processing is provided. The method comprises: acquiring data of a first document for processing; parsing the data of the first document; generating at least a first original text content fragment and a second original text content fragment based on a result of the parsing; transmitting the first original text content fragment to a first processing device; determining a status of processing of the first original text content fragment; determining, based on the status, to transmit the second original text content fragment to either the first processing device or to a second processing device for processing; receiving a second processed text content fragment from one of the first or second processing devices; and generating a processed document including the received second processed text content fragment.

In another aspect, a non-transitory computer readable medium storing instructions that are executable by one or more processors to cause the one or more processors to execute one or more of the aforementioned methods for distributed text processing is provided.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
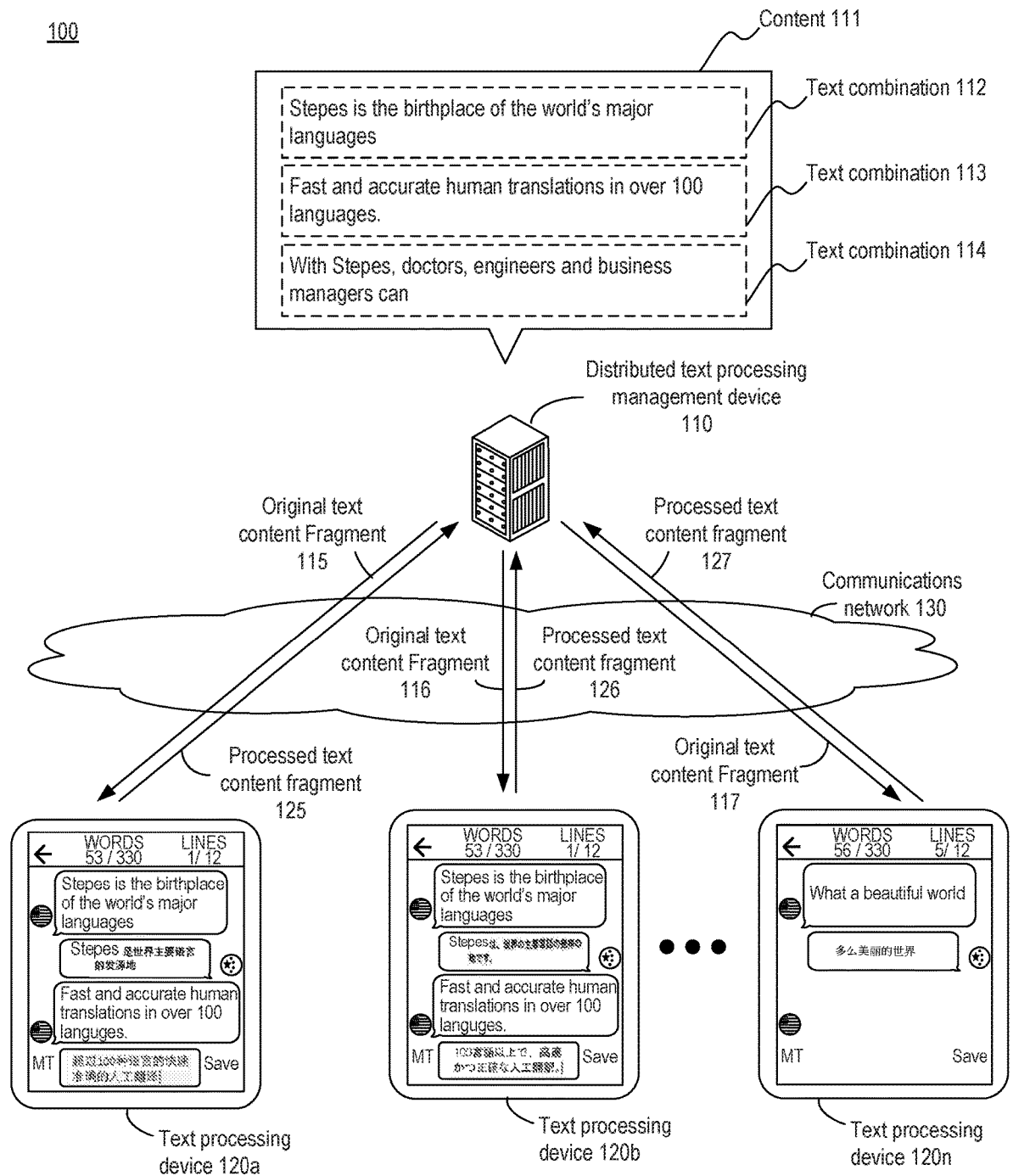
FIG. 1 is an exemplary system for distributed text processing, consistent with disclosed embodiments.

Reference will now be made in detail to the disclosed embodiments, examples of which are illustrated in the accompanying drawings. The same reference numbers are used throughout the drawings to refer to the same or like parts.

Distributed text processing tools are provided. In some embodiments, the distributed text processing tools may be provided, for example, in a system comprising a plurality of devices. Each of the plurality of devices may comprise a memory for storing a set of instructions and one or more hardware processors configured to execute a set of instructions to perform methods for distributed text processing, consistent with disclosed embodiments. At least one of the plurality of devices may be configured to execute a set of instructions to: acquire data of a first document for processing; parse the data of the first document; generate at least a first original text content fragment and a second original text content fragment based on a result of the parsing; transmit the first original text content fragment to a first processing device; determine a status of processing of the first original text content fragment; determine, based on the status, to transmit the second original text content fragment to either the first processing device or to a second processing device for processing; receive a second processed text content fragment from one of the first or second processing devices; and generate a processed document including the received second processed text content fragment.

Exemplary disclosed embodiments provide a mechanism to divide a text processing task into sub-tasks, for example, by dividing the text content of a document into text content fragments, and transmitting each text content fragment to one or more devices for processing. The particular text processing device to which a text content fragment is transmitted for processing may be decided based on various factors, such as, for example, a degree of similarity between a previously-processed text content fragment and the text content fragment to be assigned, a history of processing associated with that device, or of the translator associated with that device, among other factors.

In addition to a text content fragment to be processed, exemplary disclosed embodiments may also provide additional information to a text processing device, so as to facilitate the processing of the text content fragment. The additional information may include, for example, additional content from the original and/or processed text(s). For example, the additional information may include an additional text content fragment that contains words that are the same as or similar to words in the text content fragment to be translated or including the original text immediately preceding and/or following the text content fragment to be translated (with or without the processed text), so as to provide the translator with additional context. Alternatively or additionally, the additional information may include terminology references and/or commentary. The additional information may also include a suggested translation of the text content fragment to be translated and/or words within the fragment. Such an arrangement may provide greater consistency in the processing of the text content fragments.

FIG. 1 is a block diagram illustrating an exemplary system 100 for distributed text processing, consistent with disclosed embodiments. In one embodiment, system 100 may include a distributed text processing management device 110, text processing devices 120*a*, 120*b*, . . . 120*n*, and a communications network 130. The components and arrangement of the components included in the system 100 may vary. Thus, the system 100 may further include other components that perform or assist in the performance of one or more processes consistent with disclosed embodiments.

Management device 110 may include one or more computing systems that are configured to execute software instructions stored on one or more memory devices to perform methods consistent with disclosed embodiments. Management device 110 may include one or more of a server, a computer, an embedded system, and/or a dedicated hardware device. In certain embodiments, management device 110 may be configured as a particular apparatus, system, and the like based on the storage, execution, and/or implementation of software instructions that perform one or more operations consistent with disclosed embodiments.

In some embodiments, management device 110 may include hardware and/or software components configured to manage distributed text processing among a number of text processing devices (e.g., text processing devices 120*a*, 120*b*, . . . 120*n*). The management operations may include at least one of: generating a plurality of text content fragments from a document, assigning one or more of the text processing devices for processing the text content fragments based on the text content and/or a history of processing by these devices, transmitting data of the text content fragments to the assigned devices for processing, tracking a status of the processing by the assigned devices for updating a history of processing of the assigned devices, or generating (or updating) a processed document based on the processed text content fragments received from these devices.

In some embodiments, management device 110 may acquire data of a document and generate a plurality of text content fragments based on the document data. The document data may be acquired from, for example, a database that stores document data for processing. As an illustrative example, a web server may host a portal for translation service and may receive, from another source (e.g., a user), a document file for translation. The web server may store the document file data at a database, and transmit an indication to management device 110. Based on that indication, management device 110 may then acquire the document file data from the database.

After acquiring the document data, management device 110 may generate a plurality of text content fragments from the document data. The generation of the text content fragments may include parsing the text content to identify certain patterns and symbols. For example, the parsing may include identifying punctuations that may indicate a start and/or an end of a sentence. The parsing may also include semantic analysis by, for example, identifying a certain pattern of words. For example, the parsing may include identifying a combination of terms, as well as the separations between these terms, to identify a combination of words that may be processed as a single text content fragment.

As an illustrative example, as shown in FIG. 1, document content 111 includes the following text combinations:
"Stepes is the birthplace of the world's major languages" (112)
"Fast and accurate human translations in over 100 languages." (113)
"With Stepes, doctors, engineers and business managers can all get involved" (114)

Text combinations 112 and 114 do not end with punctuation, while text combination 113 does (full-stop). Based on the parsing of document content 111, management device 110 may identify that text combination 112 includes a noun ("Stepes"), a transitive verb ("is"), and a modifying phrase ("birthplace of the world's major languages") by, for example, comparing the parsed phrases against a database of known words and phrases. Management device 110 may then determine that text combination 112 includes a complete sentence, and may be processed as a standalone text content fragment, even if text combination 112 is not terminated with punctuation that indicates the end of a sentence. Management device 110 may also identify that text combination 113, although lacking a verb, includes words at the beginning ("Fast and accurate") which have no relationship with the modifying phrase of the preceding text combination 112 ("world's major languages"), that text combination 113 includes a noun ("human translations), a preposition ("in"), and a modifying phrase ("over 100 languages"), and that text combination 113 is terminated by a full-stop. Based on these parsing results, management device 110 may also identify that text combination 113 may be processed as a standalone text content fragment.

On the other hand, management device 110 may determine that text combination 114 includes a number of nouns and punctuations (e.g., commas) that do not signify end of a sentence, but includes no modifying phrases, and therefore text combination 114 is not to be processed as a standalone text content fragment. Based on this determination, management device 110 may continue to parse the texts subsequent to text combination 114 in the document file, until it identifies one or more phrases that, in combination with text combination 114, may be processed as a standalone text content fragment.

The qualification of a text combination as a standalone text content fragment may be based on other processing-specific criteria. For example, in a case where the processing involves a translation of the text content from a first language to a second language, the criteria may include whether a text combination conveys certain information in the first language and/or in the second language. For example, in a case where text combination 112 is to be translated from English to Chinese, management device 110 may determine that, because text combination 112 includes a noun and a modifying phrase (defined according to the English language), text combination 112 may provide a description or a definition of the noun, and therefore text combination 112 may be translated into Chinese as a standalone text content fragment.

After parsing the entire document file and generating the text content fragments, management device 110 may determine additional information that may facilitate distributed processing of the text content. The additional information may include, for example, an association between a plurality of text content fragments within the document. Alternatively or additionally, the association may link text content fragments in related documents, such as, for example, documents created by the same person or corporate entity. The association may be created based on, for example, repetition of specific words (or a combination of words) between the text content fragments. The association may be created to facilitate distributed processing of the text content. For example, when providing a first text content fragment including certain phrases to a device for processing, distributed text processing management device 110 may also provide, to that device, a reference text content fragment (and/or a previously processed translation of such a reference text content fragment) that includes some or all of the words and phrases in the text content fragment to be translated. Alternatively or additionally, the management device may present a complete or partial translation of the first text content fragment, based on a translation previously provided for the reference text content fragment. The device may then be operated to process the first content fragment in consideration of the reference text content fragment (and/or previously processed translation of the reference text content fragment). In this manner, the translator will be able to ensure that his or her translation is consistent with the previously processed translation, and vice-versa.

As an illustrative example, a first text content fragment generated from text combination 112 may be associated with a reference text content fragment generated from text combination 114 (and including other words) based on the common occurrence of the noun "Stepes" in both fragments. When transmitting the first text content fragment to a processing device for processing (e.g., translation), management device 110 may determine to transmit the reference text content fragment (and/or the previously processed translation of the reference text content fragment) to the processing device as well, so that the processing device may be operated to translate the first text content fragment with consideration of the content of the reference text content fragment (or its previously processed translation), especially with respect to the noun "Stepes." For example, based on the first text content fragment, a human translator who provides the translation may determine that the noun "Stepes" is a proper noun, and may adjust their translation of the reference text content fragment accordingly. Further, the processing device may also receive a result of the translation of the noun "Stepes" with respect to the first text content fragment that is different than the previously provided translation result in the translation of the reference text content fragment. In such a case, management device 110 may override the previously provided translation or otherwise resolve the conflict between the translation results provided with respect to the translations. With such an arrangement, the translation results of the first and reference text content fragments may be made more consistent and coherent.

In some embodiments, the additional information generated by management device 110 may also include a sequential order by which the text content fragments appear in the document. After receiving the processed text content fragments, management device 110 may generate (or update) a processed document based on the processed text content fragments and the sequential order. For example, in a case where the processing includes a translation from a first language to a second language, management device 110 may combine the translated text content fragments based on the sequential order to construct the translated document, after receiving the translated text content fragments from the text processing devices. In some embodiments, management device may carry the received translation throughout the construction of the translated document. For example, management device 110 may use the translation of one text content fragment as the translation for other identical occurrences of the particular text content fragment elsewhere in the document.

The text content fragments may further be grouped together, e.g., based on one or more associations between text content fragments in the original document. For example, management device 110 may iteratively search for phrases that are repeated in the original document and associate the text content fragments in which the repeated phrases appear. As a first iteration, for example, management device 110 may search for repetitions of complete text content fragments, and iteratively search for repetitions of shorter and shorter phrases within text content fragments, and finally search for individual words that may be repeated throughout the original document. The various text content fragments may be associated, e.g., in an association table. The association table may identify the repeated text string (including, e.g., complete text content fragments, phrases of various lengths, and words) and further identify the text content fragments in which the repeated text string appears (e.g., by sequential fragment number). The association table may further indicate a weight given to each repeated text string, e.g., so that longer text strings that appear in a greater number of text content fragments are given a greater weight than shorter text strings that appear in a fewer number of text content fragments. The length of a text string may be determined based on the number of words in the string. Alternatively, the length of a text string may be determined by the number of characters (e.g., letters) in the string.

The grouped and ungrouped text content fragments may then be queued for processing. The queue may be based in part on the weight given to any grouped fragments. The queue may also be based on the sequential order of the fragments within the original document. For example, the highest weighted groups may be placed first in the queue, followed by the next highest weighted group, and so on, followed by ungrouped fragments in sequential order. Alternatively, ungrouped fragments that immediately follow those fragments that are associated with the highest weighted group may be placed earlier in the queue than fragments that are more separated from the grouped fragments. In this manner, the translators that are assigned to process the ungrouped fragments may be given the benefit of reviewing previously completed translations of the grouped fragments, when considering their translations, as described below.

Management device 110 may assign one or more of the text content fragments to a particular translator for processing. For example, as shown in FIG. 1, management device 110 may assign an original text content fragment 115 to be processed by a translator associated with text processing device 120a, assign an original text content fragment 116 to be processed by a translator associated with text processing device 120b, and assign an original text fragment 117 to be processed by a translator associated with text processing device 120n. Management device may then transmit data associated with original text content fragments 115, 116, and 117 to text processing devices 120a, 120b, and 120n respectively, via network 130 based on the assignment. In some embodiments, management device may also transmit a processing request including data associated with an original text content fragment (e.g., any one of original text content fragments 115, 116, and 117) to multiple text processing devices (e.g., more than one of text processing devices 120a, 120b, and 120n), each of which can display the received original text content fragment, and monitor for an indication of acceptance of the processing request.

The assignment of a text content fragment to a particular translator may be based on various factors. For example, in a case where the management device transmits an original text content fragment to multiple text processing devices, the management device can assign the original text content fragment to a text processing device (e.g., text processing device 120a) that is the first, among the multiple text processing devices, to transmit an indication of acceptance. In that case, the management device can transmit a confirmation to text processing device 120a, which can maintain the displaying of the original text fragment at text processing device 120a. On the other hand, other text processing devices (e.g., text processing devices 120b and 120n) may, after determining that a confirmation has not been received (e.g., within a certain period after receiving the original text fragment), determine that they are not assigned the original text content fragment, and can stop displaying the original text fragment.

The assignment can also be based on other criteria. For example, the assignment may be based on an indication of workload at a processing device. The indication of workload may be based on, for example, an indicator of the future availability of the particular translator and/or an indicator of past performance of the particular translator.

The availability indicator or score may be based on input provided by the particular translator. For example, the availability indicator may be based on the particular translator's response to a request for information regarding their future availability. In some embodiments, management device 110 may transmit a request for such information concurrently with (or before) the transmission of every Nth text content fragment to the processing device(s) associated with the particular translator.

The request for availability information may include information regarding upcoming processing requests in the queue, for example, a due date and time for the processing, a volume of text content (e.g., as measured by group weight, or number of fragments, phrases, and/or words) to be processed, etc. Based on a workload at the processing device (e.g., an amount of text content that remains unprocessed in the queue) and the information included in the processing request, the translator may transmit an indication of acceptance or rejection of the request via a processing device 120 associated with the translator. Distributed text processing management device 110 may then determine a workload at that processing device based on the received indication of acceptance or rejection. In some embodiments, management device 110 may also store a history of indications of acceptance and rejections of a processing device, for estimating a workload of that processing device at a specific time and day.

Alternatively, the future availability of a particular translator may be predicted, e.g., based on the past availability of the particular translator. For example, management device 110 may analyze past performance data (as described below) and predict the future availability of the particular translator based on their past work patterns, e.g., so that translators that are routinely more productive on weekends are given a higher availability score for future weekend days, etc.

The assignment of a particular text content fragment or associated group of fragments may also be based on a history of performance of a translator associated with a particular text processing device or group of devices. For example, as discussed below, management device 110 may, after transmitting data of a text content fragment to a text processing device, track performance of the requested processing the text content fragment. The status may include, for example, whether the processing is complete or incomplete (e.g., pending), whether the processing is completed before a due date and time (or, alternatively, whether the processing is overdue), whether the processed text content fragment satisfies certain criteria such that the processing may be determined to be a success (or a failure when the criteria are not satisfied), etc. Distributed text processing management device 110 may then assign a score to the performance history of a particular translator.

Moreover, the performance may also be measured based on other metrics. The metrics may include, for example, a speed of performance (measured by, for example, the time it took to complete the processing of a text content fragment, weighted by a number of words included in the text content fragment), a percentage of the current document processed by a particular translator, etc.

In some embodiments, the performance history may also be categorized with respect to various attributes, such as time and day of the processing tasks, specific requirements of the processing tasks, etc. For example, the specific requirements may include a limit on word numbers, a limit on processing time, etc. The performance history may then be categorized for different word number limits and processing time limits, to provide finer granularity in, for example, assessing a translator's past translation performance under various requirements.

The assignment may then be based on, for example, whether the performance history of a particular translator satisfies certain criteria. For example, management device 110 may assign processing tasks related to certain documents only to translators that meet a certain minimum availability score and/or performance score. In some embodiments, management device 110 may determine not to transmit a text content fragment to processing device(s) associated with a particular translator until and unless the translator has completed processing of the previously transmitted text content fragment.

As an illustrative example, management device 110 may maintain a first performance score and a first availability score for a particular translator for translations from English to Japanese, and a second performance score and availability score for the same translator for translations from Japanese to English. Management device 110 may also maintain separate performance and availability scores for separate language-pairs that may be handled by the same translator (e.g., for translations between Japanese and English, translations between Chinese and English, and translations between Chinese and Japanese). Based on the performance and availability scores, management device 110 may determine, as shown in FIG. 1, to transmit original text content fragment 115 to text processing device 120a for translation from English to Chinese, and to transmit original text content fragment 116 to text processing device 120b for translation from English to Japanese.

Moreover, the assignment may also be based on the grouping of original text content fragments. For example, management device 110 may assign some or all of the text content fragments associated with a particular group to be processed by the same translator.

The availability and performance indicators or scores may be weighted for consideration during the assignment process. For example, management device may assign an identifier to each translator and, in some embodiments, set a weight associated with the identifier (or alternatively assign additional identifiers to the same translator) based on the performance and/or availability scores. Processing tasks may be assigned to the identifiers (or weighted identifier) associated with a particular translator in a lottery-style system.

The identifier may be associated with an application (app) that may be accessible via each of several processing devices (e.g., a laptop computer, a tablet, and a mobile device) that is used by a particular translator, such that the translator may access the processing tasks that are assigned to them via each of the several devices via the app running on the particular device. For example, a translator may log into the system using the application interface to retrieve or receive assigned processing tasks, which may be transmitted to the processing device upon login. In addition, the translator may use the application interface to transmit completed processing tasks, or respond to processing requests, etc.

Management device 110 may transmit data associated with, for example, the original text content fragments 115 and 116 to text processing devices 120a and 120b, respectively, over network 130. Management device 110 may then track a status of processing of the text content fragments 115 and 116, e.g., to determine whether management device 110 receives a corresponding processed text content fragment 125 (or 126) within the due date and time specified in the associated processing request. The status may also include, as discussed above, whether the processing result is later judged a success or a failure.

The success or failure of particular processing task may include, for example, a quality indicator or score reflecting a judgment of the quality of the processing. In a case where the processing includes translation, the quality indicator or score may be generated based, in part, on whether the translation is in the target language. In one embodiment, the determination may be based, in part, on whether the format of the data of the processed text content fragment reflects the target language. If, for example, the data of the processed text content fragments does not include Unicode characters corresponding to the target language, management device 110 may determine that the translation is a failure.

The quality indicator may also be generated based, in part, on a comparison between the number and types of words (e.g., nouns, verbs, adjective, etc.) in both the original (pre-translation) text content fragment and the translated text content fragment. The comparison may be specific to the languages involved in the translation. For example, text content fragment 115 of FIG. 1 may include text combination 112 "Stepes is the birthplace of the world's major languages" which include four nouns ("Stepes," "birthplace," "world," and "languages") in English. If the processed text content fragment 125 does not include four nouns in the target language, management device 110 may also determine that the translation fails.

Further, the quality indicator may also be generated, in part, based on a comparison of the processed text content fragment against another processed text content fragment. The comparison may be based on, for example, an association between the text content fragments. As discussed above, an association between the text content fragments may be created based on, for example, repetition of specific words (or a combination of words) between the text content fragments. The quality indicator may be generated based on the consistency of the translation results for these repeated words in the associated text content fragments. As an illustrative example, a previous Chinese translation of text combination 112 "Stepes is the birthplace of the world's major languages" may repeat the English word "Stepes" (i.e., untranslated). After transmitting text combination 114 ("With Stepes, doctors, engineers and business managers can") to a processing device and receiving the corresponding processed text content fragment, management device 110 may determine whether the processed text content fragment includes the English term "Stepes." If it does not, then management device 110 may determine that the translation fails on that basis.

After determining a status of the processing (e.g., whether it is still ongoing, late, successful, or a failure), management device 110 may update a performance history associated with the particular translator, and then determine the next step. For example, in a case where the processing of text content fragment 115 is determined to fail, management device 110 may transmit text content fragment 115 to a text processing device 120b (associated with a different translator than text processing device 120a) for processing. In a case where the processing of text content fragment 115 is determined to be successful, management device 110 may add the translation to the translated document and transmit the next text content fragment to text processing device 120a for processing.

After receiving processed text content fragments corresponding to individual text content fragments (or groups of fragments) of the original document, management device 110 may generate (or update) the processed document (e.g., a translation of the original document) based on the processed text content fragments. As discussed above, management device 110 may generate a sequential order in which the original (pre-processing) text content fragments appear in the document. Management device 110 may generate (or update) a processed document by arranging the processed text content fragments in the sequential order, e.g., by matching the processed text content fragment with the sequence number of the corresponding original text content fragment.

Text processing devices 120 may include one or more processors configured to execute software instructions stored in memory. Text processing devices 120 may also include software that, when executed by a processor, performs known network-related communication and content display processes. For example, text processing devices 120 may execute browser software that generates and displays interface screens (e.g., a display device). Text processing devices 120 may also execute software that receive and process packetized data (e.g., a processing request, data of original text content fragments, etc.) received from management device 110 according to any suitable protocol (e.g., TCP/IP) via network 130, and to transmit packetized data (e.g., responses to process requests, data of processed text content fragments, etc.) to management device 110 via the same or a different network 130.

In some embodiments, text processing devices 120 may be configured to execute an application. For example, text processing devices 120 that are implemented as mobile devices may include a mobile application (app) that provides an interface to input and display information related to a text processing task. The information related to a text processing task may include, for example, an original (pre-processing) text content fragment received from management device 110 for processing, and a second text content fragment generated as a result of processing (e.g., translating) the original text content fragment. The interface may be configured to display, simultaneously, a plurality of original text content fragments and the corresponding processed text content fragments according to a specific configuration. In a case where the processing includes translation from a first language to a second language, the interface may be configured to display, simultaneously, a plurality of related text content fragments in the first language (e.g., English), and a plurality of corresponding text content fragments in the second language (e.g., Chinese). As an illustrative example, the interface may display a paragraph from the original text that includes the text content fragment to be translated, in order to show the text content fragment to the translator in context. To the extent that the paragraph has been previously translated, the interface may further display the translation(s).

The interface may display other information in one or more other display modes. For example, as discussed above, management device 110 may provide to a text processing device (e.g., text processing device 120a) additional information that may facilitate distributed processing of the text content. For example, when providing a first original text content fragment including certain words to text processing device 120a for processing, management device 110 may also provide, to text processing device 120a, a second original text content fragment (or processed text content fragment) that include these words. The interface of the text processing app may then display the first and second original text content fragments in a second display mode. In a third display mode, the interface may display, in whole or in part, the original and/or the current draft of the processed document, so that the translator may review the text content fragment that is to be processed in context.

The display modes may be switched based on a user input received from a hardware interface which may include, for example, an audio interface, a touch screen, motion sensor, and/or physical buttons. For example, the user input may be in the form of a voice command received and processed by the audio interface, and/or actions detected by the touch screen, motion sensors, and/or the hardware buttons of the text processing device.

Network 130 may be any type of network configured to provide communications between components of system 100. For example, network 130 may be any type of network (including infrastructure) that provides communications, exchanges information, and/or facilitates the exchange of information, such as the Internet, a Local Area Network, a cellular network (e.g., LTE, 4G, 5G, etc.), WiFi, Bluetooth®, or other suitable network that enables the sending and receiving of information between the components of system 100. In other embodiments, one or more components of system 100 may communicate directly through a dedicated communication link(s) (not shown) between management device 110 and text processing device 120a, 120b, . . . . 120n.

Figure 2:
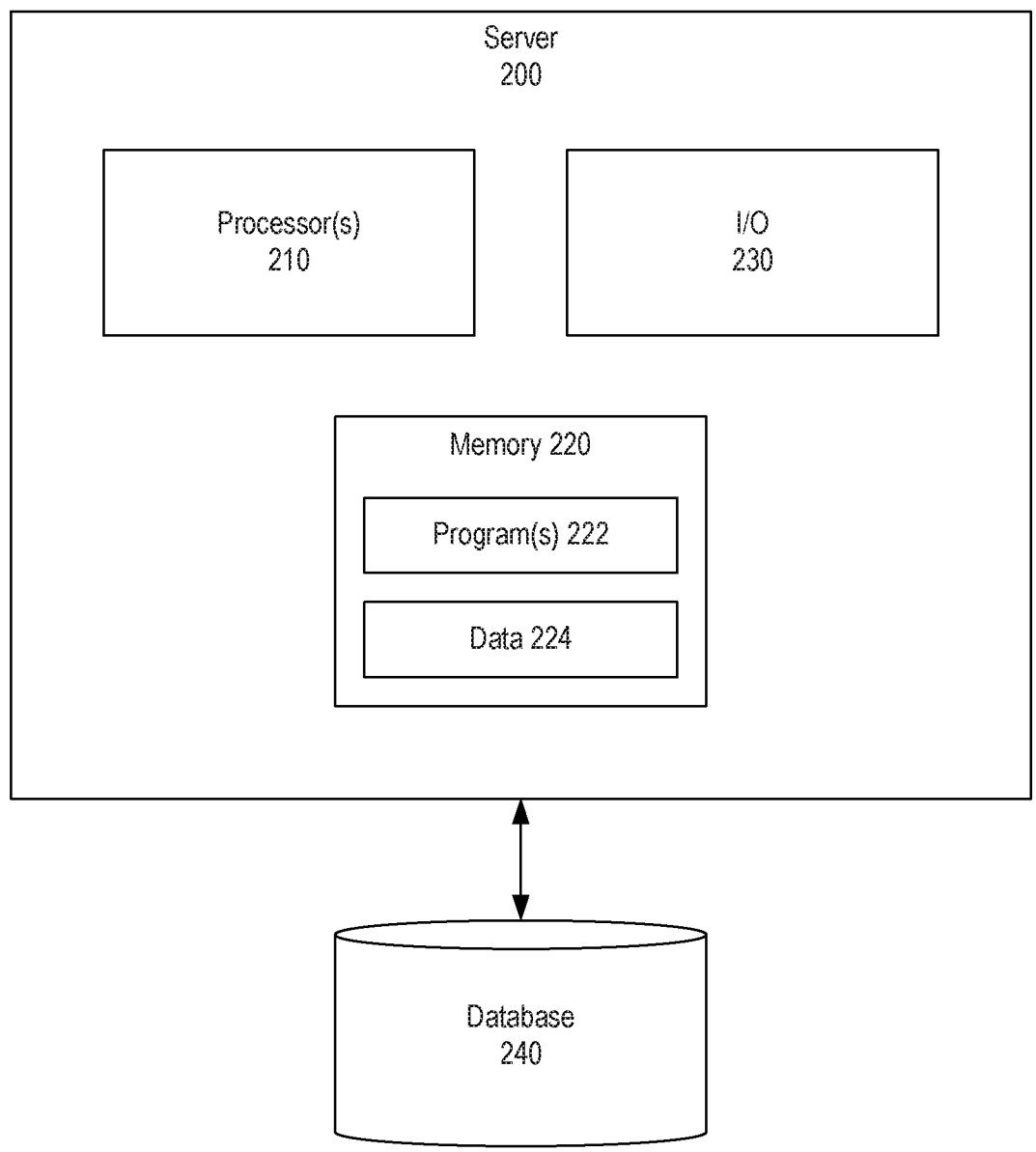
FIG. 2 is a block diagram of an exemplary system for distributed text processing management, consistent with disclosed embodiments.

FIG. 2 shows an exemplary server 200 for distributed text processing management, consistent with disclosed embodiments. In some embodiments, server 200 may correspond to distributed text processing management device 110. It should be understood, however, that variations of server 200 may perform disclosed functions of one or more of management device 110, text processing devices 120*a* and 120*b*, or other components of system 100.

In some embodiments, server 200 may include one or more processors 210, one or more memories 220, and one or more input/output (I/O) devices 230. According to some embodiments, server 200 may be implemented using an embedded system or similar computing device(s) that generate, maintain, and provide web site(s), application program interface (APIs), and/or mobile applications consistent with disclosed embodiments. Server 200 may be standalone, or it may be part of a subsystem, which may be part of a larger system. For example, server 200 may be implemented using distributed servers that are remotely located and communicate over a network (e.g., network 130) or a dedicated network, such as a LAN.

Processor 210 may include one or more known processing devices, such as a microprocessor (e.g., from the Pentium™ or Xeon™ family manufactured by Intel™, the Turion™ family manufactured by AMD™, or any of various processors manufactured by Sun Microsystems). The disclosed embodiments are not limited to any type of processor(s) 210.

Memory 220 may include one or more storage devices configured to store instructions used by processor 210 to perform functions related to disclosed embodiments. For example, memory 220 may be configured with one or more software instructions, such as program(s) 222 that may perform one or more operations when executed by processor 210. The disclosed embodiments are not limited to separate programs or computers configured to perform dedicated tasks. For example, memory 220 may include one or more program(s) 222 that performs the functions of the server 200. Additionally, processor 210 may execute one or more programs located remotely from server 200. For example, management device 110 and text processing devices 120*a* and 120*b* may access one or more remote programs that perform functions related to certain disclosed embodiments. Memory 220 may also store data 224 that the system may use to perform operations consistent with disclosed embodiments.

I/O devices 230 may be one or more devices configured to allow data to be received and/or transmitted by server 200. I/O devices 230 may include one or more digital and/or analog communication devices that allow server 200 to communicate with other machines and devices, such as other components of system 100.

Server 200 may also be communicatively connected to one or more database(s) 240, either directly or through network 130. Database 240 may include one or more memory devices that store information and are accessed and/or managed through server 200. By way of example, database(s) 240 may include MS SQL, Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. In one aspect, database 240 may be included with server 200. Alternatively, database 240 may be located remotely from the server 200. Database 240 may include computing components (e.g., database management system, database server, etc.) configured to receive and process requests for data stored in memory devices of database(s) 240 and to provide data from database 240.

Figure 3:
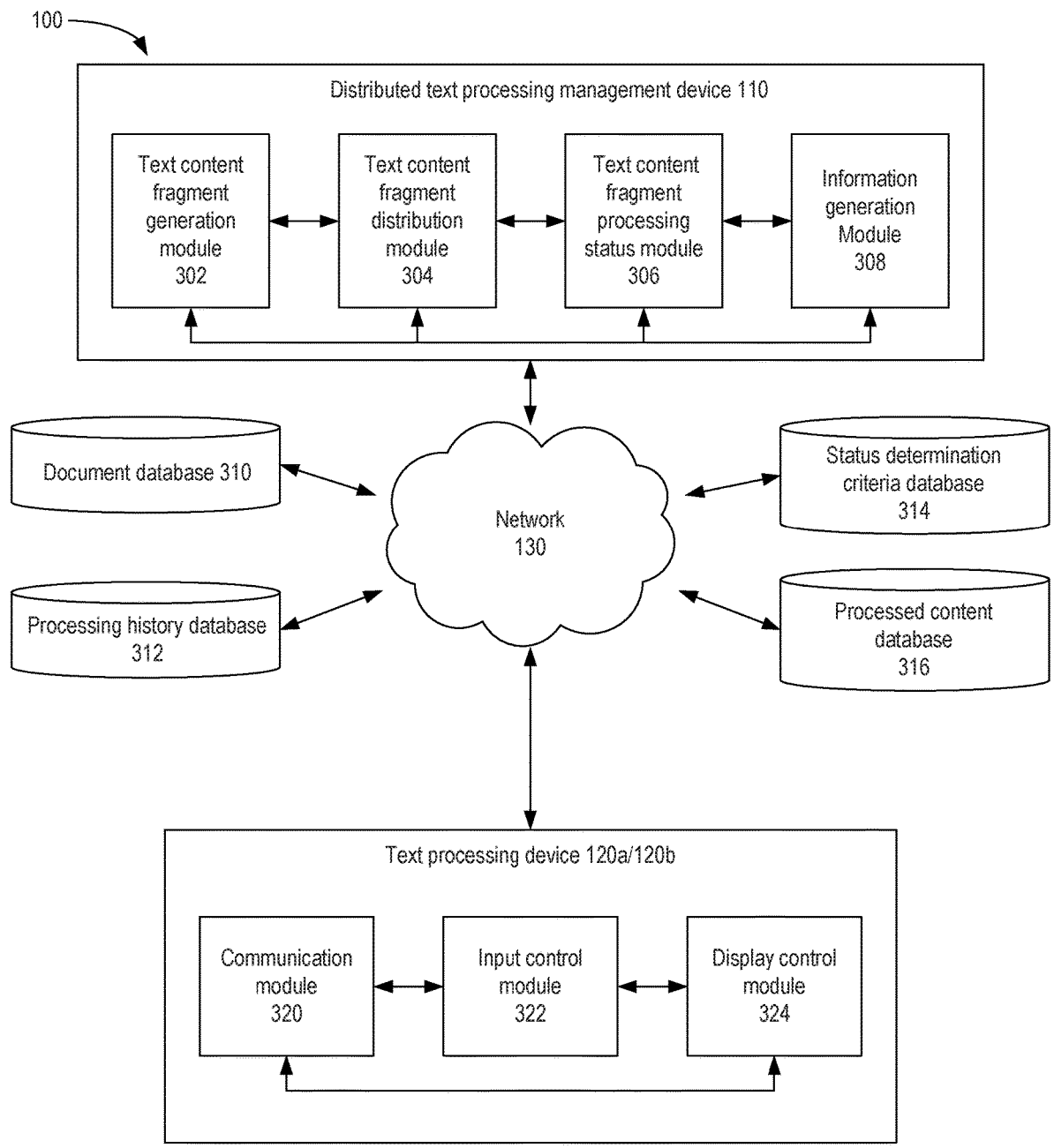
FIG. 3 is a block diagram of an exemplary system for distributed text processing, consistent with disclosed embodiments.

FIG. 3 is a diagram illustrating an exemplary configuration of the components of system 100, including various additional components and features thereof. It should be understood that the configuration of system 100 depicted in FIG. 3 is exemplary, and that other configurations, including additional, fewer, and/or alternative components and features are possible.

In some embodiments, management device 110 may include features configured to manage a text processing operation distributed among a plurality of text processing devices. The management operations may include at least one of: generating a plurality of text content fragments from a document, assigning one or more of the text processing devices for processing the text content fragments based on the text content, performance history, and or future availability of the translator associated with these devices, transmitting data of the text content fragments to the assigned devices for processing, tracking a status of the processing by the assigned devices, updating a performance history of the associated translator, and/or generating (or updating) a processed document based on the processed text content fragments received from these devices.

For example, management device 110 may include a text content fragment generation module 302, a text content fragment distribution module 304, a text content fragment processing status module 306, and an information generation module 308. For the purposes of this disclosure, "modules" (also known as "engines") may be implemented in software, hardware, firmware, a mix of any of those, or the like. For example, if the disclosed "modules" are implemented in software, they may be stored in a memory associated with management device 110. Processors, I/O devices, and memory devices may be used to perform processes to implement and facilitate operations of the modules. Thus, the modules may include code instructions executable by one or more processors, alone or in various combinations with other modules disclosed in this or other embodiments. For example, as shown in FIG. 3, text content fragment generation module 302, text content fragment distribution module 304, text content fragment processing status module 306, and information generation module 308, and/or with other modules of management device 110, shown or not shown in FIG. 3, to perform functions consistent with disclosed embodiments. If the disclosed "modules" are implemented in hardware, they may comprise an embedded system or other dedicated hardware configured by machine code, assembly code, or the like to interact with other modules of management device 110 to perform functions consistent with disclosed embodiments.

In some embodiments, text content fragment generation module 302 may be configured to execute software instructions to acquire data related to a document and generate a plurality of text content fragments based on the document data. Text content fragment generation module 302 may acquire the document data from, for example, a document database 310, which may receive the data from a web server that hosts a text processing portal. The generation of the text content fragments may include parsing the text content to identify certain patterns and symbols. For example, the parsing may include identifying punctuations that may indicate a start and an end of a sentence. The parsing may also include semantic analysis by identifying a certain pattern of words that represent a complete sentence, and/or may convey certain information. Based on a result of the parsing, a combination of words may be extracted from the document data as a text content fragment.

In some embodiments, text content fragment distribution module 304 may determine to assign one or more of the text content fragments to a participating translator for processing, and to transmit the text content fragments to processing device(s) associated with the assigned translator. In some embodiments, text content fragment distribution module 304 may also transmit a processing request including data associated with an original text content fragment (e.g., any one of original text content fragments 115, 116, and 117) to multiple text processing devices (e.g., more than one of text processing devices 120a, 120b, and 120n), which can display the received original text content fragment, and monitor for an indication of acceptance of the processing request.

As described above, the assignment may be based on various factors, including the translator's promptness in transmitting an indication of acceptance of a processing request, the translator's availability score, performance score, etc. These and other metrics may be stored in, for example, database 312, and can be associated with a particular translator and with a particular type of processing task (e.g., a translation from English to Chinese, a translation from English to Japanese, etc.). In some embodiments, the scores can also be stored in separate databases (not shown in FIG. 3) and can be retrieve individually for the assignment determination.

In some embodiments, text content fragment processing status module 306 may determine a status of a processing of a text content fragment. As described above, the status may include, for example, whether the processing is incomplete (e.g., pending), whether the processing completes before a due date and time, whether the processed text content fragment satisfies certain criteria such that the processing may be determined to be a success or a failure, etc. Information about the success/failure criteria may be stored in, for example, a status determination criteria database 314, which may store a set of rules and thresholds for use in determining the success or failure of the processing. The rules and thresholds may be specific to the processing and, in a case where the processing includes translation, may also be specific to the languages.

After determining that the processing by a text processing device is successful (or is a failure), text content fragment processing status module 306 may also update a performance history (database 312) for the translator associated with the text processing device. This information is made available to text content fragment distribution module 304, for use in determining whether and when to assign additional processing tasks to the particular translator. If the processing is determined to be successful, text content fragment processing status module 306 may also add the received processed text content fragments to processed content database 316 for insertion into the processed document.

Text processing device 120a (and 120b) may be configured to provide an interface to input and display information related to a text processing task. In some embodiments, text processing device 120a may include a communication module 320, an input control module 322, and a display control module 324.

Communication module 320 may be configured to receive data of text content fragments, as well as data related to processing of the text content fragments, from management device 110. The data related to processing of the text content fragments may include, for example, a processing request, text content fragments that have been or being processed by other text processing devices, as well as processed text content fragments. Communication module 320 may also be configured to transmit data to management device 110. The data transmitted may include, for example, an indication of acceptance or rejection of a processing request, processed text content fragments, etc., as described above.

Input control module 322 may be configured to receive an input via a hardware interface which may include, for example, an audio interface, a touch screen, a motion sensor, and one or more buttons. The input may be related to processing of a text content fragment. For example, the input may be generated by a user who speaks or types a word to translate a text content fragment received by communication module 320 and provided by display control module 324 for displaying. The input may also be generated to provide an indication to indicate acceptance or rejection of a processing request, and to switch between the aforementioned display modes.

In some embodiments, display control module 324 may also control displaying on the interface according to one of a plurality of display modes. For example, as discussed above, the displaying on the interface may be controlled based on a first display mode, a second display mode, or a third display mode, and display control module 324 may control a switching of the display for the interface, based on an indication of display mode switching received by input control module 322. The indication of display mode switching may include, for example, a voice command, a touch-screen action (e.g., a swiping action to a first direction for the second display mode, and a swiping action to a second direction for the third display mode, etc.), an action detected by a motion sensor and/or hardware buttons, etc.

In some embodiments, in the first display mode, the interface may be configured to provide a chat-room style display, with each of the displayed original text content fragment (or a group of original text content fragments) and the processed text content fragment (or a group of processed text content fragments) enclosed in a window, to mimic a natural conversation (e.g., a "chat") between, for example, a provider of the original text content fragment (e.g., distributed text processing management device 110) and a provider of the processed text content fragment (e.g., a translator). For example, the original text content fragment may be sent to the translator's mobile device in an SMS text message format, and the translator may provide the processed fragment (translation) in a responsive text message. A standard text messaging application may be used to display a history of the requested translation from management device 110 and the translator's reply, e.g., in which the original text content fragment is displayed in one location, and the processed text content fragment is displayed in another location (e.g., below or adjacent to the corresponding original text content fragment).

The original text content fragment and the processed text content fragment may be displayed in any manner that indicates a correspondence between the fragments. For example, in a case where the processing includes a translation, a first translated text content fragment may be displayed immediately below a first original text content fragment that corresponds to the translated text content fragment. A second original text content fragment may be displayed below the first translated text content fragment, and a second translated text content fragment that corresponds to the second original text content fragment may be displayed below the second original text content fragment, and so on. As another example, the first original text content fragment may be displayed on one side of the interface (e.g., on the left side), and the first translated text content fragment (that corresponds to the first original text content fragment)

may be displayed on another side of the interface (e.g., on the right side) and adjacent to the first original text content fragment.

Further, a timing of the displaying of original text content fragment and the processed text content fragment in the first display mode can also be configured in a manner that indicates a correspondence between the fragments, and mimics natural conversation. For example, the interface can provide a text box for the operator to type in a processed (e.g., translated) text content fragment, and a "send" button for the operator to transmit data of the processed text content fragment to distributed text processing management device 110. The interface can first display a first original text content fragment, allow the operator to type in a first processed text content fragment in the text box, and then display the first processed text content fragment below (or adjacent to) the first original text content fragment after receiving an indication that the operator has finished typing (e.g., upon receipt of a text message containing the translation). The interface can then display the second original text content fragment for processing after, for example, receiving data of the second original text content fragment from distributed text processing management device 110. The timing of the displaying of the processed and original text content fragments can also be configured to mimic a natural conversation involving a question and a reply, in which the original text content fragment is displayed first as a question, followed by the processed text content fragment being displayed next as a reply.

Further, the displaying of the original text content fragment can also be determined based on whether a confirmation of assignment is received from distributed text processing management device 110. For example, in a case where the management device transmits an original text content fragment to multiple text processing devices, and transmits a confirmation of assignment to one of the multiple text processing devices, those text processing devices that do not receive the confirmation (e.g., within a certain period after receiving the original text content fragment) may stop displaying the original text content fragment.

By providing a chat-room style interface and displaying the corresponding original text content fragment and the processed text content fragment that mimic a natural conversation, embodiments of the present disclosure allow the translator(s) to interact with distributed text processing management device 110 in an intuitive manner. Further, since the text content fragments are displayed serially, the interface is more efficient and suitable for display on mobile devices.

In some embodiments, in the first display mode, the windows and the displayed fonts may also be configured to provide distinguishing indications (e.g., different window colors, different font sizes and types, etc.) between original text content fragment and processed text content fragments. Display control module 324 may also display, with or without the text content fragment currently processed by the text processing device, other processed text content fragments previously generated by the text processing device. For example, based on a navigation action (e.g., a scrolling action) detected by input control module 322, display control module 324 may display an additional text content fragment that contains words that are the same as or similar to words in the text content fragment to be translated or including the original text immediately preceding and/or following the text content fragment to be translated (with or without the processed text), so as to provide the translator with additional context. Alternatively or additionally, the interface may also provide other information, such as terminology references and/or commentary. The additional information may also include a suggested translation of the text content fragment to be translated and/or words within the fragment. Such an arrangement may provide greater consistency in the processing of the text content fragments, such as terminology reference, translation suggestion, comments received from other sources, as well as audio information (e.g., in a case where voice-to-text input is enabled, the translator may provide the translation by voice input, a recording of which may be provided to management device 110). The recorded translation may be converted to text using voice-recognition software for the applicable language either before or after transmission to management device 110.

In the second display mode, the interface may display a plurality of original content fragments, including a first original text content fragment transmitted to the text processing device for processing, and one or more additional original text content fragments associated with the first original text content fragment. The displaying of the original text content fragments, in the second display mode, may be updated based on an input received from input control module 322. For example, based on a navigation action (e.g., a scrolling action) detected by input control module 322, the interface may be configured to display a certain portion of the document which may or may not include the original text content fragment being processed by the text content processing device.

In some embodiments, the displaying of the additional original text content fragment, in the second display mode, may also correspond to a navigation action detected when the displaying is in the first display mode. For example, as discussed above, based on a navigation action (e.g., a scrolling action) detected by input control module 322, display control module 324 may display a previously-processed text content fragment in a different portion of the document. When displaying that previously-processed text content fragment in the first display mode, and after detecting an indication of display mode switching (by input control module 322), display control module 324 may switch to the second display mode and display an original text content fragment that corresponds to the previously-processed text content fragment.

In the third display mode, the interface may display a plurality of processed content fragments, including a first processed text content fragment generated at the text processing device, and one or more additional processed text content fragments associated with the first processed text content fragment. Based on the association between the first and the one or more additional original text content fragments, management device 110 may determine whether the processing of one or more additional original text content fragment has completed (for example, by checking a status of processing). If it is, management device 110 may acquire the one or more additional processed text content fragments from processed content database 316, and transmit the one or more additional processed text content fragments to the text processing device that processes the first original text content fragment. In some cases, the displaying of the processed text content fragments, in the third display mode, may also be updated based on an input received from input control module 322. For example, based on a detected navigation action, the interface may be configured to display one or more processed text content fragments corresponding to a certain portion of the document.

The additional original text content fragment (in the second display mode) and the additional processed text content fragment (in the third display mode) can be provided to facilitate processing of the first original text content fragment. For example, as discussed above, in a case where the processing is translation, the additional content fragments can be provided to provide context for the translator to perform a translation of the first original text content fragment.

In some embodiments, the displaying of the additional processed text content fragments, in the third display mode, may also correspond to a navigation action detected when the displaying is in the first display mode. For example, as discussed above, based on a navigation action (e.g., a scrolling action) detected by input control module 322, display control module 324 may display a previously-processed text content fragment from a different portion of the document. When displaying, in the first display mode, that previously-processed text content fragment, and after detecting an indication of display mode switching (by input control module 322), display control module 324 may switch to the third display mode and display other previously-processed text content fragments (whether or not they are generated by that text processing device).

In some embodiments, text processing device 120a (and 120b) may also include additional software and hardware components (not shown in FIG. 3) configured to process the text content fragments. Those components may be configured to, for example, perform spell checking, provide machine translation for at least part of the text content fragments, perform a search for additional information for at least some of the words included in the text content fragments at a source of information (e.g., Internet, or other depositories of information), etc.

Figure 4:
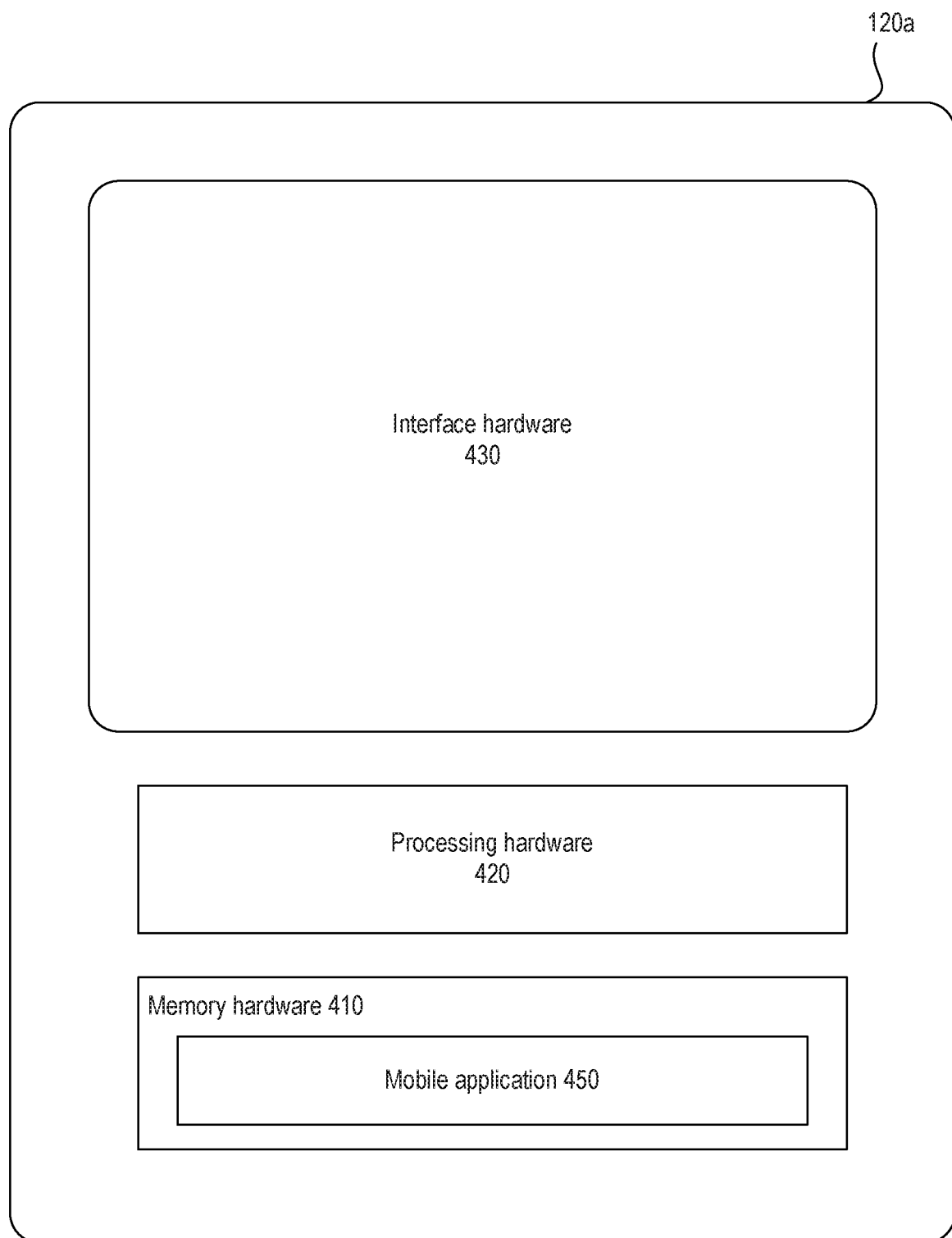
FIG. 4 is a block diagram of an exemplary device for distributed text processing, consistent with disclosed embodiments.

FIG. 4 depicts an exemplary text processing device 120a (or 120b) in more detail, consistent with disclosed embodiments. Text processing device 120a may include memory hardware 410, processing hardware 420, and interface hardware 430. Memory hardware 410 and processing hardware 420 may have similar functionalities to, respectively, processor 210 and memory 220 of server 200. Interface hardware 430 may include interfaces to I/O devices, as well as network interfaces. For example, the I/O devices may include output devices such as a display, a speaker, etc., while input devices may include hardware buttons, touch screen, etc. Network interfaces may include wireless connection interface under various protocols (e.g., WiFi, Bluetooth, cellular connection, etc.), wired connection (e.g., Ethernet), etc. The network interface of interface hardware 430 enables text processing device 120a to interact with other devices (e.g., management device 110), while the I/O interface of interface hardware 430 enables text processing device 120a to interact with a user (e.g., to receive instruction from the user, to display information to the user, etc.). Other features of text processing device 120a may include a connection device configured to wirelessly connect to network 130 (e.g., a cellular communication device, WiFi device, etc.).

Text processing device 120a may be configured to execute a mobile application 450 stored in memory hardware 410. For example, text processing device 120a may be included in a smartphone, a tablet, a watch, or a dedicated hardware device configured to run a mobile operating system (e.g., iOS, Android, etc.) which may be compatible with a variety of mobile applications provided by third-party providers. In some embodiments, mobile application 450 may provide at least some of the functionalities of communication module 320, input control module 322, and display control module 324, which enable the exemplary text processing device 120a to receive, process, and display original text content fragments of a document, and to receive and display processed text content fragments of the document, and to transmit processed text content fragments to management device 110 for generating (or updating) the processed document.

Figure 5:
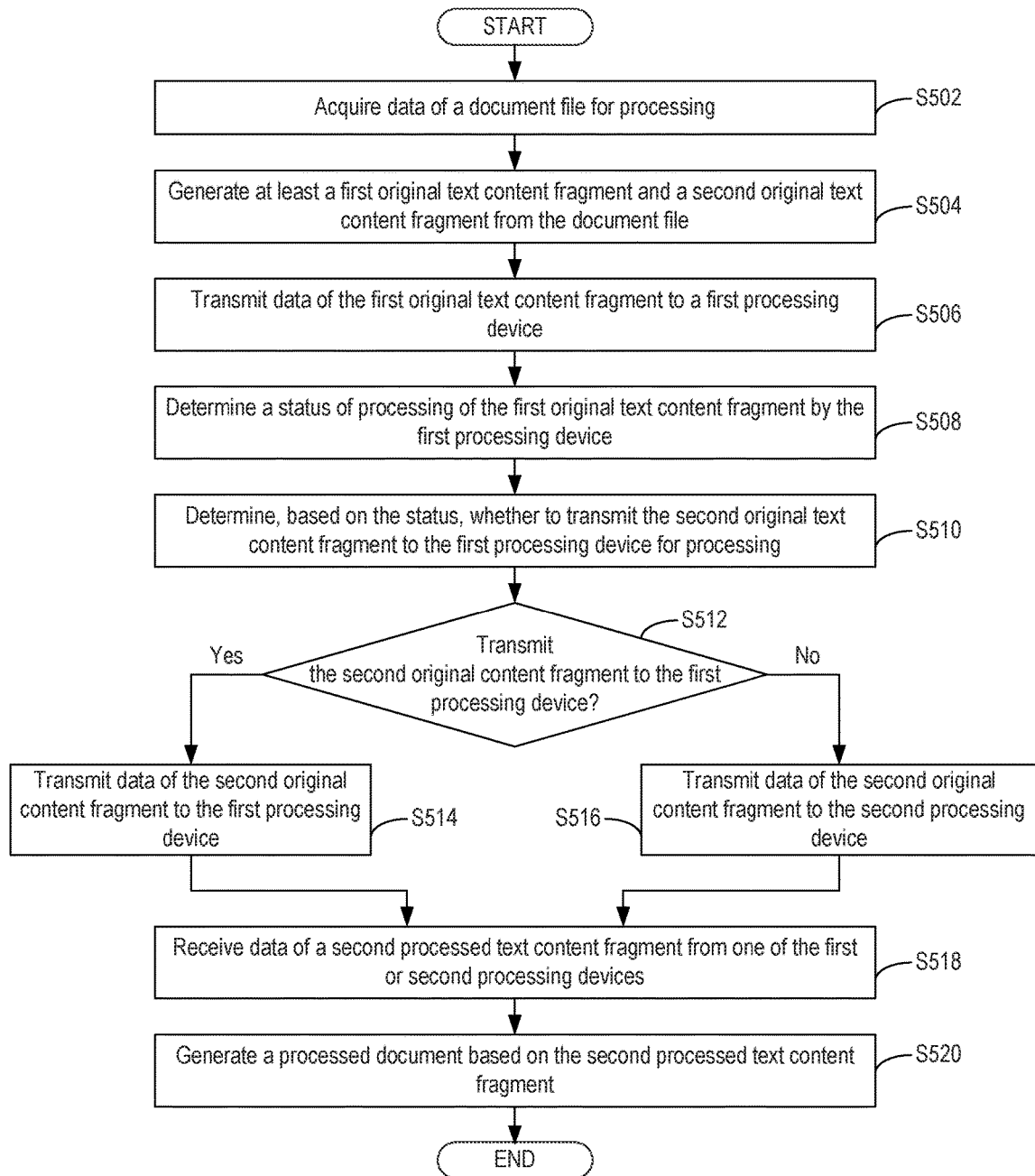
FIG. 5 is a flowchart of an exemplary method for distributed text processing management, consistent with disclosed embodiments.

FIG. 5 is a flowchart of an exemplary method 500 consistent with the present disclosure. Method 500 may be performed by a system when executing instructions via processing hardware. The system may include, for example, management device 110.

In step S502, the system may acquire data of a document file for processing. The document data may be acquired from, for example, document database 310. In step S504, the system may generate at least a first original text content fragment and a second original text content fragment from the document file. The generation of the text content fragments may include parsing the text content to identify certain patterns and symbols. The parsing may also include semantic analysis by identifying a certain pattern of words that represent a complete sentence, and/or may convey certain information. Further, the system may also generate, in step S504, other information, such as a sequential order by which the original text content fragments appear in the document. In some embodiments, steps S502 and S504 may be performed by text content fragment generation module 302 as well as information generation module 308.

After generating the first and second original text content fragments in step S504, the system may proceed to step S506 to transmit data of the first original text content fragment to a first processing device (e.g., text processing device 120a). The determination may be based on an assignment, by the system, of text processing device 120a to process the first original text content fragment.

In step S506, the system may also transmit, in addition to data of the first original text content fragment, data of another original text content fragment associated with the first original text content fragment. In some embodiments, step S506 may be performed by text content fragment distribution module 304 and information generation module 308.

After transmitting data of the first original text content fragment to a first processing device in step S506, the system may proceed to step S508 to determine a status of processing of the first original text content fragment by the first processing device. The status may include, for example, whether the processing is incomplete (e.g., pending), as described above. The performance history may also be updated based on the status determined in step S508.

In step S510, the system may determine, based on the status, whether to transmit the second original content fragment to the first processing device for processing. For example, if the processing of the first original content fragment is determined to be a failure, in step S508, the system may determine not to transmit the second original content fragment to the first processing device for processing. In some embodiments, step S510 may be performed by text content fragment distribution module 304. If the system determines to transmit the second original content fragment to the first processing device in step S512, the system may then transmit data of the second original content segment to the first processing device, in step S514. On the other hand, if the system determines not to transmit the second original content fragment to the first processing device in step S512, the system may then transmit data of the second original content segment to the second processing device, in step S516. In some embodiments, steps S508-S516 may be performed by text content fragment distribution module 304.

In step S518, the system may receive data of a second processed text content fragment from one of the first or second processing devices. The system may then determine a status of a processing of the second original text content fragment. If the status of processing is determined to be successful (e.g., based on the satisfaction of certain criteria, as described above), the system may store the second processed text content fragment at a database (e.g., processed content database 316). In some embodiments, step S518 may be performed by text content fragment processing status module 306.

In step S520, the system may acquire the second processed text content fragment from processed content database 316, and generate (or update) a processed document including the second processed text content fragment (and other processed text content fragments). The generation (or updating) of the processed document may also be based on the sequential order determined in step S502. For example, in a case where the processing includes a translation, a translated document including all of the translated text content fragments for the document file can be generated in step S520.

Figure 6:
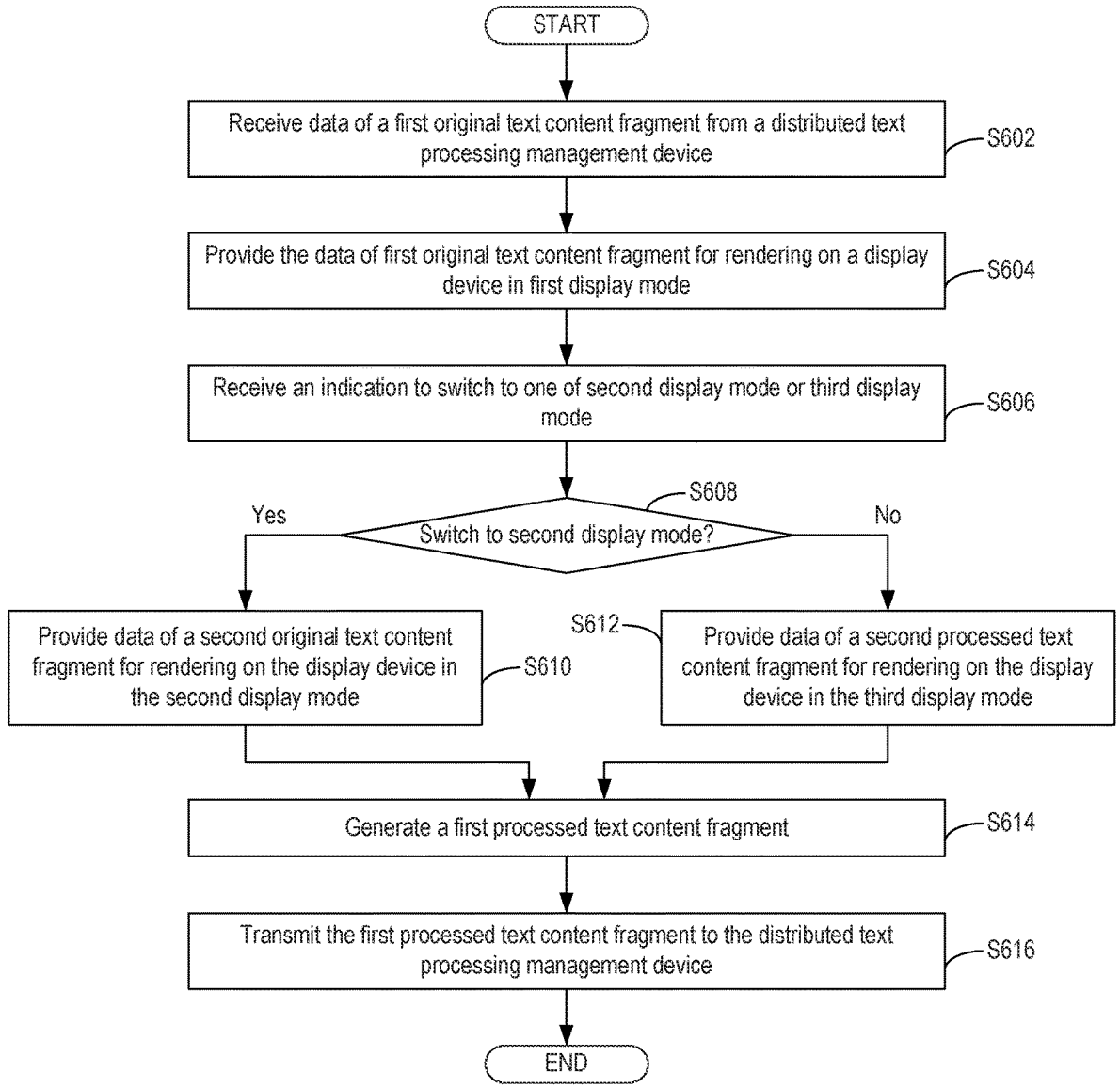
FIG. 6 is a flowchart of an exemplary method for facilitating distributed text processing, consistent with disclosed embodiments.

FIG. 6 is a flowchart of an exemplary method 600 for facilitating distributed text processing, consistent with disclosed embodiments. Method 600 may be performed by a system when executing instructions via processing hardware. The system may include, for example, text processing device 120a (or 120b).

In step S602, the system receives data of a first original text content fragment from a management device (e.g., management device 110). The data may be received from the management device via a network (e.g., network 130). In some embodiments, step S602 may be performed by communication module 320.

After receiving the data of the first original text content fragment, the system may provide the data of the first original text content fragment for rendering on a display device (e.g., a display interface of the text processing device 120a) in a first display mode (step S604). In the first display mode, a first processed text content fragment corresponding to the first original text content fragment may also be displayed, if it is available (e.g., after being generated at the system). In some embodiments, step S604 may be performed by display control module 324.

In step S606, the system may receive an indication to switch to one of the second display mode or the third display mode. The indication may be based a user input received from a hardware interface which may include, for example, a touch-screen. For example, if the system (e.g., input control module 322) detects a swiping action over the touchscreen in a first direction, the system may determine to switch to the second display mode; if the system detects a swiping action in a second direction, the system may determine to switch to the third display mode.

If the system receives an indication to switch to the second display mode (step S608), the system may provide data of one or more additional original text content fragments for rendering on the display device (step S610). The additional original text content fragments may be received from the management device. On the other hand, if the system receives an indication to switch to the third display mode (step S608), the system may provide data of one or more additional processed text content fragment for rendering on the display device (step S612). The additional processed text content fragments may correspond to the additional text content fragments displayed in the second display mode, as discussed above. The additional processed text content fragment may also be associated with an original text content fragment being displayed in the first display mode when the switching of display mode occurs. The additional original text content fragment (in the second display mode) and the additional processed text content fragment (in the third display mode) can be provided to facilitate processing of the first original text content fragment. For example, in a case where the processing is translation, the additional content fragments can be provided to provide context for the translator to perform a translation of the first original text content fragment. The additional processed text content fragment may be received from the management device. In some embodiments, steps S608 to S612 may be performed by display control module 324.

After the additional original text content fragment (or second processed text content fragment) is provided for rendering on the display device, the system may proceed to step S614 to generate a first processed text content fragment that corresponds to the first original text content fragment (received in step S602). The system may process the first original text content fragment with consideration of the content of at least one of the additional original and processed text content fragments. The system (e.g., communication module 320) may then transmit the first processed text content fragment to the distributed text processing management device 110, in step S616.

Figure 7A:
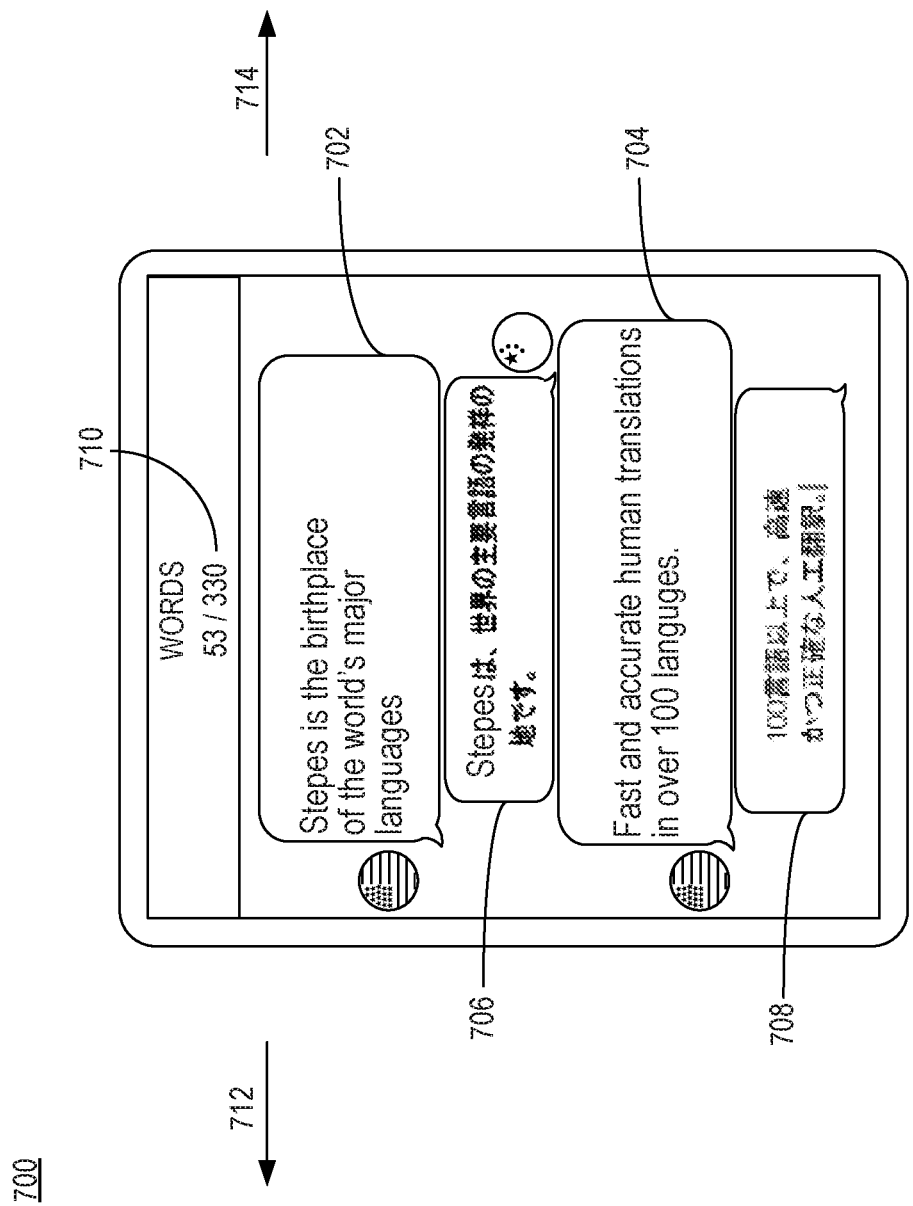
FIGS. 7A-7C illustrate exemplary user interfaces for distributed text processing, consistent with disclosed embodiments.
Figure 7B:
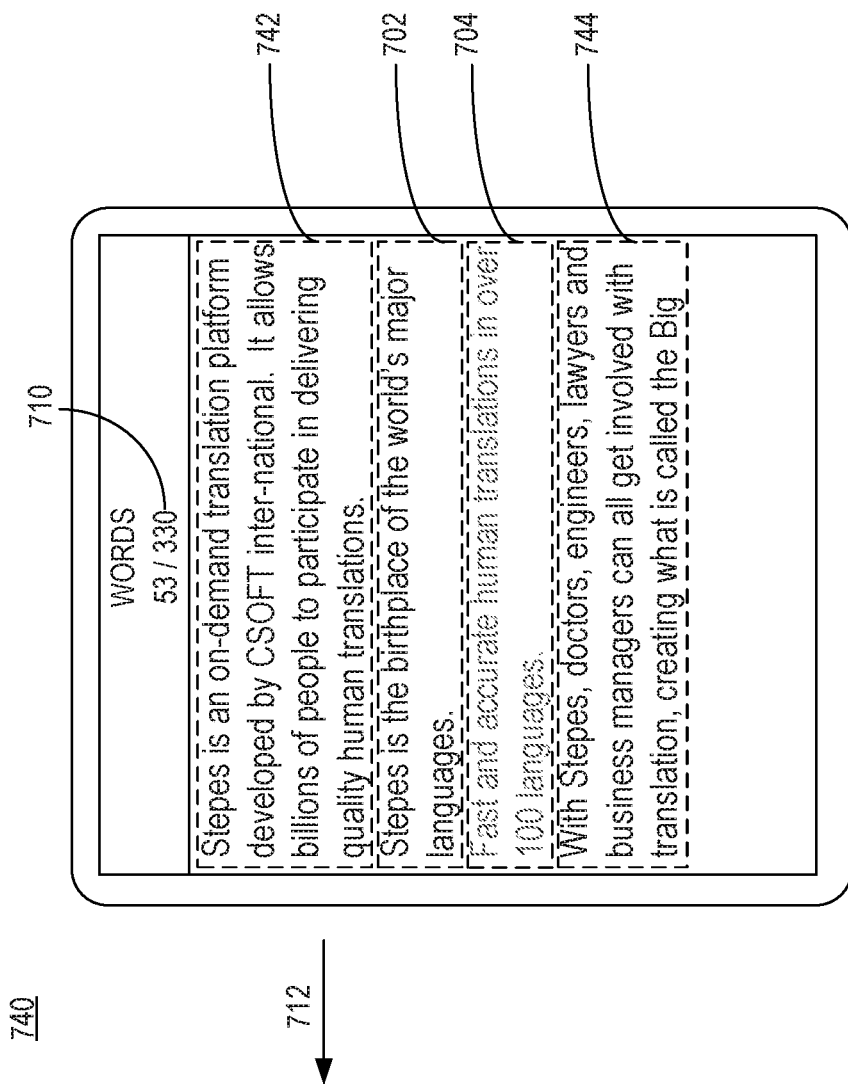
Figure 7C:
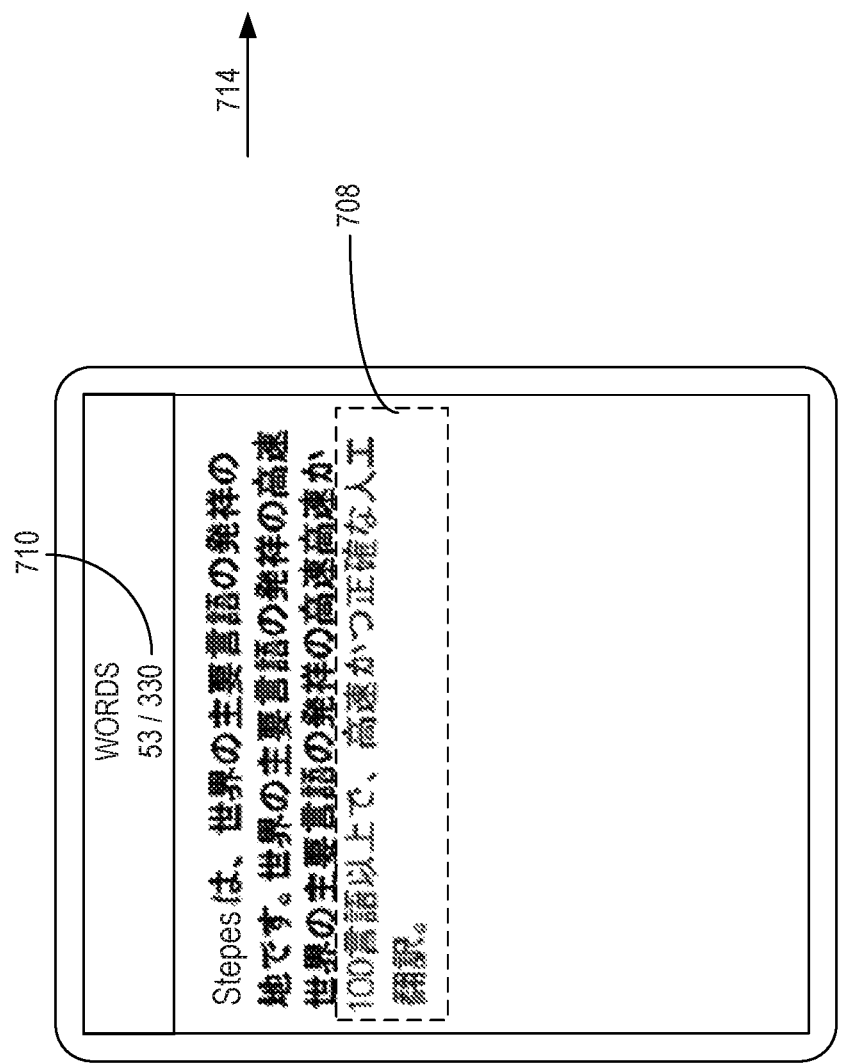

FIGS. 7A-7C illustrate exemplary user interfaces 700, 740 and 780 for distributed text processing, consistent with disclosed embodiments. In some embodiments, user interfaces 700, 740 and 780 may be provided by a text processing device (e.g., text processing devices 120a and 120b) when executing a method for distributed text processing (e.g., method 500 of FIG. 5). As an illustrative example, user interfaces 700, 740, and 780 are provided for a text processing that includes translation from a first language (e.g., English) to a second language (e.g., Japanese).

FIG. 7A illustrates exemplary user interface 700, which may be provided by the text processing device in the first display mode. As shown in FIG. 7A, an original text content fragment 702 and an original text content fragment 704 (both in English) are displayed in interface 700. A processed text content fragment 706 and a processed text content fragment 708 (both in Japanese) are also displayed in interface 700. Processed text content fragment 706 may be generated by translating original text content fragment 702 from English to Japanese. Processed text content fragment 708 may be generated by translating original text content fragment 704. As shown in FIG. 7A, interface 700 may display one original text content fragment and one corresponding translated text content fragment together as a pair. Each text content fragment may be displayed in a window, and the windows and the displayed fonts may also be configured to provide distinguishing indications (e.g., different colors, different font sizes and types, etc.) between original text content fragment and processed text content fragments.

Interface 700 may also display other information. For example, interface 700 may include a field 710 configured to display a total number of words included in all of the original text content fragments the text processing device has received, for a document, at a certain point of time. As an illustrative example, the second original text content fragment is the last original text content fragment received by the text processing device, and field 710 may indicate that including the second original text content fragment, the text processing device has received a total of 53 words. This information may also be used to track the volume of processed text content fragments that have been transmitted to, for example, management device 110. This information is also available to management device 110, which may then track a progress of the processing of the document, and the workload of the text processing device.

Interface 700 may also provide an interface to receive an indication to switch the display mode. For example, if interface 700 is provided on a touch-screen, a swiping action to a first direction (e.g., to the left, as indicated by arrow 712) on any location within interface 700 may generate an indication to switch to the second display mode. On the other hand, a swiping action to a second direction (e.g., to the right, as indicated by arrow 714) on any location within interface 700 may generate an indication to switch to the second display mode. The swiping action may be detected by, for example, input control module 322.

Reference is now made to FIG. 7B, which illustrates exemplary user interface 740, which may be provided by the text processing device in the second display mode. In the second display mode, the interface may display a plurality of original text content fragments, including original text content fragments that are transmitted to the text processing device for processing (e.g., original text content fragments 702 and 704), as well as additional original text content fragments that are not being processed at the text processing device (e.g., original text content fragments 742 and 744). The additional original text content fragments may be provided by management device 110 based on an association between these fragments with one of the first and second original text content fragments processed at the text processing devices. In some embodiments, interface 740 may also provide an indication about which of the displayed original text content fragments is the last fragment transmitted to the text processing device for processing. For example, as shown in FIG. 7B, the indication may be made by changing the font color of the text content fragment (e.g., original text content fragment 704) compared with other fragments being displayed.

When in the second display mode, input control module 322 may also detect an indication to switch back to the first display mode. For example, a swiping action to a first direction (e.g., to the left, as indicated by arrow 712) on any location within interface 740 may generate an indication to switch back to the first display mode, and the swiping action may be detected by input control module 322.

Reference is now made to FIG. 7C, which illustrates exemplary user interface 780, which may be provided by the text processing device in the third display mode. In the third display mode, the interface may display a plurality of processed text content fragments, including the latest processed text content fragments at the text processing device (e.g., processed text content fragment 708), as well as other processed text content fragments that correspond to other original text content fragments. Interface 780 may also provide an indication about which of the displayed processed text content fragments is the last processed fragment at the text processing device. For example, as shown in FIG. 7C, the indication may be made by changing the font color of the processed text content fragment (e.g., processed text content fragment 708) compared with other fragments being displayed.

When in the third display mode, input control module 322 may also detect an indication to switch back to the first display mode. For example, a swiping action to a second direction (e.g., to the right, as indicated by arrow 714) on any location within interface 780 may generate an indication to switch back to the first display mode, and the swiping action may be detected by input control module 322.

Computer programs created on the basis of the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for facilitating distributed translation of text content, the system comprising:
   a memory storing a set of instructions; and
   a hardware processor configured to execute the set of instructions to:
      receive, from a management device, data of a first original text content fragment, the first original text content fragment being a standalone text content fragment expressed in a natural language;
      provide the data of first original text content fragment for rendering on a display device in a first display mode;
      receive an indication to switch to one of a second display mode or a third display mode;
      responsive to receiving an indication to switch to the second display mode, provide data of one or more additional original text content fragments for rendering on the display device;
      responsive to receiving an indication to switch to the third display mode, provide data of one or more additional translated text content fragments for rendering on the display device;
      generate a first translated text content fragment that corresponds to the first original text content fragment; and
      transmit data of the first translated text content fragment to the management device;
   wherein the displaying of the one or more additional translated text content fragments and the displaying of the one or more additional original text content fragments are configured to facilitate a translation of the first text content fragment,
   wherein at least one of the one or more additional original text content fragments and the one or more additional translated text content fragments is associated with the first original text content fragment, and wherein the association is based on one or more common words included in the first and second original text content fragments and a length of the one or more common words.

2. The system of claim 1, wherein at least one of the one or more additional original text content fragments and the one or more additional translated text content fragments is associated with the first original text content fragment; wherein the association is based on a relative location between the first and second original text content fragments.

3. The system of claim 1, wherein at least one of the indication to switch to the second display mode and the indication to switch to the third display mode is received via a touch-screen interface of the display device.

4. The system of claim 1, wherein the indication to switch to the second display mode is associated with a swiping action in a first direction, and the indication to switch to the third display mode is associated with a swiping action in a second direction.

5. A non-transitory computer-readable storage medium having stored therein instructions that, when executed by a processor, causes the processor to perform a method for facilitating distributed translation of text content, the method comprising:

receiving, from a management device, data of a first original text content fragment, the first original text content fragment being a standalone text content fragment expressed in a natural language;

providing the data of first original text content fragment for rendering on a display device in a first display mode;

receiving an indication to switch to one of a second display mode or a third display mode;

responsive to receiving an indication to switch to the second display mode, providing data of one or more additional original text content fragments for rendering on the display device;

responsive to receiving an indication to switch to the third display mode, providing data of one or more additional translated text content fragments for rendering on the display device;

generating a first translated text content fragment that corresponds to the first original text content fragment; and transmitting data of the first translated text content fragment to the management device;

wherein the displaying of the one or more additional translated text content fragments and the displaying of the one or more additional original text content fragments are configured to facilitate a translation of the first text content fragment, wherein at least one of the one or more additional original text content fragments and the one or more additional translated text content fragments is associated with the first original text content fragment, and wherein the association is based on one or more common words included in the first and second original text content fragments and a length of the one or more common words.

* * * * *